United States Patent
Kambara (10) Patent No.: US 8,273,496 B2
(45) Date of Patent: Sep. 25, 2012

(54) FUEL CELL CONTAINING A CATHODE DIFFUSION LAYER HAVING A FABRIC STRUCTURE

(75) Inventor: Hironori Kambara, Ikoma (JP)

(73) Assignee: Sharp Kabushiki Kaisha, Osaka-Shi, Osaka (JP)

( * ) Notice: Subject to any disclaimer, the term of this patent is extended or adjusted under 35 U.S.C. 154(b) by 1072 days.

(21) Appl. No.: 12/018,301

(22) Filed: Jan. 23, 2008

(65) Prior Publication Data

US 2009/0253012 A1    Oct. 8, 2009

(30) Foreign Application Priority Data

Jan. 25, 2007    (JP) .................................. 2007-015145

(51) Int. Cl.
*H01M 8/10* (2006.01)
(52) U.S. Cl. ......... 429/480; 429/481; 429/534; 429/530
(58) Field of Classification Search .................. 429/480, 429/482, 481, 534, 450, 456, 530
See application file for complete search history.

(56) References Cited

FOREIGN PATENT DOCUMENTS

| JP | 6-267555 A | | 9/1994 |
|----|----|----|----|
| JP | 2001-332274 A | | 11/2001 |
| JP | 2005-302472 A | | 10/2005 |
| JP | 2006-19162 | * | 1/2006 |
| JP | 2006-19162 A | | 1/2006 |
| JP | 2006-172960 A | | 6/2006 |
| JP | 2006-269122 A | | 10/2006 |
| JP | 2006-269126 | * | 10/2006 |
| JP | 2006-269126 A | | 10/2006 |

* cited by examiner

*Primary Examiner* — Raymond Alejandro
(74) *Attorney, Agent, or Firm* — Nixon & Vanderhye P.C.

(57) ABSTRACT

A fuel cell including an anode conductive layer, an anode catalyst layer, an electrolyte membrane, a cathode catalyst layer, a cathode conductive layer, and a cathode diffusion layer stacked in this order, in which the cathode diffusion layer has a fabric structure in which a water-swellable fiber and a non-water-swellable fiber are arranged. Preferably, in the fabric structure, the water-swellable fiber is arranged in either one of a warp and a weft. Preferably, gas permeability of the cathode diffusion layer increases as the water absorption amount of the water-swellable fiber increases.

10 Claims, 4 Drawing Sheets

FUEL CELL CONTAINING A CATHODE DIFFUSION LAYER HAVING A FABRIC STRUCTURE

This nonprovisional application is based on Japanese Patent Application No. 2007-015145 filed with the Japan Patent Office on Jan. 25, 2007, the entire contents of which are hereby incorporated by reference.

BACKGROUND OF THE INVENTION

1. Field of the Invention

The present invention relates to a fuel cell, and in particular, to a fuel cell capable of maintaining high power generation performance even when the external environment changes, and enabling miniaturization of a fuel cell system.

2. Description of the Background Art

In recent years, fuel cells as compact power sources for portable electronic devices that support an information society have been much expected because of their potential ability of offering high electrical efficiency as a single power supply. A fuel cell is a chemical cell that supplies a portable electronic device or the like with electrons by utilizing such an electrochemical reaction that a fuel such as hydrogen gas or a methanol aqueous solution is oxidized at an anode, and oxygen in air is reduced at a cathode.

Among a variety of fuel cells, a polymer electrolyte membrane fuel cell (hereinafter, referred to as "PEMFC") using a proton-exchanged ion exchange membrane as an electrolyte membrane has the potential to practical application as a compact power source, because it provides high electrical efficiency in an operation at such a low temperature as 100° C. or less, and eliminates the necessity of heat application from outside in contrast to the fuel cell that operates at high a temperature such as a phosphoric-acid fuel cell or a solid oxide fuel cell, and thus requires no massive auxiliaries.

As a fuel that is supplied to such a PEMFC, for example, hydrogen gas using a hyperbaric gas cylinder, or mixture gas of hydrogen gas and carbon dioxide gas obtained by decomposing an organic liquid fuel by a reformer is used.

Since a direct methanol fuel cell (hereinafter referred to as "DMFC") which generates electricity by supplying an anode of a PEMFC with a methanol aqueous solution and directly drawing out protons and electrons from the methanol aqueous solution needs no reformer, it has higher potential to practical use as a compact power source compared to a PEMFC. Furthermore, since it uses a methanol aqueous solution which is liquid under atmospheric pressure as a fuel, it can handle a fuel having a high volume energy density in a simple container without using a high pressure gas cylinder. Therefore, it realizes excellent safety as a compact power source and enables downsizing of the fuel container. Therefore, the DMFC attracts attentions from the viewpoint of application to a compact power source of a portable electronic device, in particular, application as an alternative secondary cell for a portable electronic device.

In a DMFC, the following reactions occur at an anode and a cathode.

Anode: $CH_3OH + H_2O \rightarrow CO_2 + 6H^+ + 6e^-$

Cathode: $O_2 + 4H^+ + 4e^- \rightarrow 2H_2O$

Theoretically, since methanol and water react at a molar ratio of 1:1, it is necessary to supply the anode with water in addition to methanol. When a liquid fuel having a high fuel concentration is used, a methanol aqueous solution of such a low concentration as 3 to 10% by mass is generally used because reduction in power generation performance due to crossover of the fuel in the solid polymer electrolyte membrane used as an electrolyte is large.

Methanol and water may be stored in advance in a fuel tank as a mixture of methanol and water, however, by collecting water generated at the cathode and supplying the anode with the water, the tank can be miniaturized because methanol can be stored in the fuel tank at a high concentration.

Generally, the water generated at the cathode is collected by auxiliaries that require an electric power such as a pump, and the generated water thus collected is supplied to the anode. However, use of auxiliaries such as a pump will limit miniaturization of the fuel cell. Therefore, it is effective for miniaturization of a fuel cell system to transport water to the anode by utilizing a water concentration gradient between the cathode and the anode in an electrolyte membrane rather than using auxiliaries such as a pump.

In order to achieve stable transportation of water to the anode by utilizing the water concentration gradient, it is necessary to keep the water concentration on the cathode side in the electrolyte membrane high, and thus to keep the humidity and the water concentration in the atmosphere of the cathode catalyst layer high.

However, in the case where gas permeability of the cathode diffusion layer is made small for the purpose of suppressing release of water, the water amount in the cathode diffusion layer is excess when the humidity of air of the external environment supplied to the cathode increases, so that the output is decreased due to flooding and power generation performance of the fuel cell is deteriorated.

On the other hand, in the case where gas permeability of the cathode diffusion layer is ensured in consideration of increase in the humidity of air of the external environment supplied to the cathode, the relative humidity of the atmosphere of the cathode catalyst layer decreases when the operation temperature increases or when the humidity of air of the external environment decreases, which promotes evaporation of water. This makes it difficult to keep an appropriate water concentration gradient in the electrolyte membrane.

In consideration of such a circumstance, for example, Japanese Patent Laying-Open No. 2006-172960 discloses a fuel cell capable of varying water drainability in the diffusion layer depending on the water content in the fuel cell without using control by various sensors and the like. Concretely, the fuel cell disclosed in Japanese Patent Laying-Open No. 2006-172960 has such a structure that a diffusion layer and a catalyst layer are sequentially stacked on each face of the electrolyte membrane, and two separators are disposed to sandwich the electrolyte membrane, and a water-absorbable resin that increases/decreases the volume depending on the water absorption amount is provided between two separators.

To be more specific, when the water amount in the fuel cell increases, the water-absorbable resin absorbs water to increase its volume, so that the power of the separators pushing the electrolyte membrane is reduced, and the thickness of the diffusion layer is increased. As a result, water easily travels in the diffusion layer, and water drainability in the diffusion layer increases.

On the other hand, when the water amount in the fuel cell is reduced, the volume of water-absorbable resin decreases due to water evaporation, and the power of the separators pushing the electrolyte membrane increases so that the thickness of the diffusion layer is reduced. As a result, water travels in the diffusion layer with difficulty, and drainability of water in the diffusion layer is reduced.

SUMMARY OF THE INVENTION

However, in the fuel cell disclosed in Japanese Patent Laying-Open No. 2006-172960 as described above, the thickness of the diffusion layer is controlled only depending on the water condition in the region where the water-absorbable resin is disposed. Therefore, when extreme excess or shortage of the water amount occurs only in the region where the water-absorbable resin is disposed, it is impossible to appropriately control the thickness of the diffusion layer, and it is impossible to satisfactorily respond to the change in the external environment, leading to the problem of deterioration in power generation performance.

In order to prevent occurrence of such malfunction in controlling the thickness of the diffusion layer due to uneven distribution of water, it is necessary to dispose the water-absorbable resin in plural positions so as to realize uniform dispersion over the power generation area. This increases the regions that do not contribute to power generation within the power generation area, and results in the problem of deterioration in power generation performance.

Further, in order to prevent occurrence of the aforementioned malfunction, it is necessary to dispose the water-absorbable resin to penetrate the electrolyte membrane, leading to the problem that the sealing structure is complicated.

In light of the above, it is an object of the present invention to provide a fuel cell capable of maintaining high power generation performance even in the case of change in the external environment, while enabling miniaturization of a fuel cell system.

The present invention provides a fuel cell having an anode conductive layer, an anode catalyst layer, an electrolyte membrane, a cathode catalyst layer, a cathode conductive layer, and a cathode diffusion layer stacked in this order, wherein the cathode diffusion layer has a fabric structure in which a water-swellable fiber and a non-water-swellable fiber are arranged.

Preferably, in the fuel cell of the present invention, the fabric structure is formed by arranging the water-swellable fiber in either one of a warp and a weft.

Preferably, in the fuel cell of the present invention, gas permeability of the cathode diffusion layer increases as the water absorption amount of the water-swellable fiber increases.

Preferably, in the fuel cell of the present invention, the fabric structure includes a core-in-sheath fabric structure in which the water-swellable fiber is arranged in a core part, and the non-water-swellable fiber is arranged in a sheath part.

Preferably, in the fuel cell of the present invention, the surface of the cathode diffusion layer has water repellency.

Preferably, in the fuel cell of the present invention, at least part of the cathode catalyst layer is in contact with the cathode diffusion layer.

Preferably, in the fuel cell of the present invention, the cathode diffusion layer is made up of a plurality of layers.

Preferably, in the fuel cell of the present invention, a layer made of a non-water-swellable fiber is arranged in a layer being in contact with the cathode catalyst layer of the cathode diffusion layer.

Preferably, in the fuel cell of the present invention, at least one of the cathode catalyst layer and the cathode conductive layer is joined with the cathode diffusion layer.

Preferably, in the fuel cell of the present invention, on the surface opposite to the anode catalyst layer, of the anode conductive layer, an anode diffusion layer and a fuel permeation layer are stacked in this order, and the anode diffusion layer is provided with a communication hole communicating with external of the fuel cell.

According to the present invention, it is possible to provide a fuel cell capable of maintaining high power generation performance even in the case of change in the external environment, while enabling miniaturization of a fuel cell system.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

In the following, embodiments of the present invention will be described. In the drawings of the present invention, the same reference numeral denotes the same part or a corresponding part.

<First Embodiment>

Figure 1:
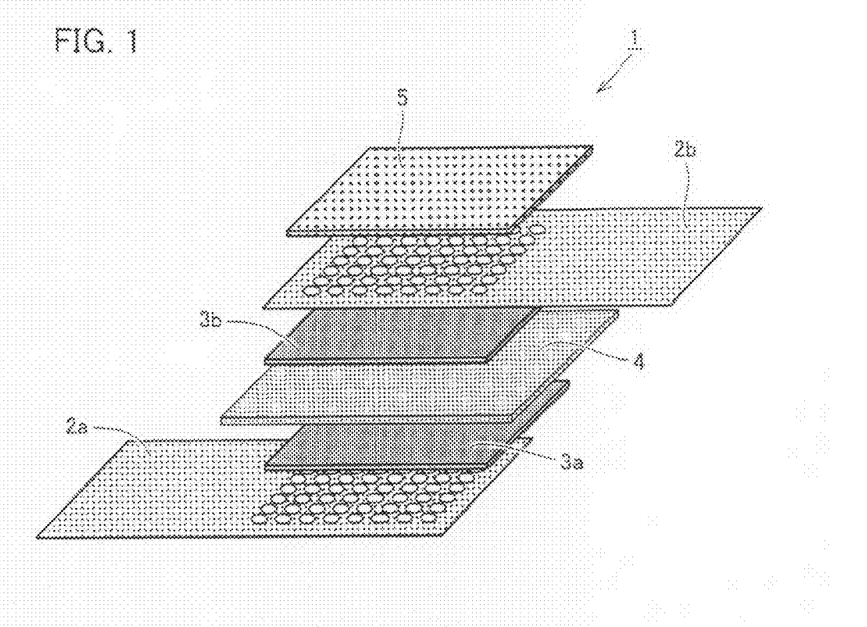
FIG. 1 is a schematic exploded perspective view showing one example of a fuel cell of the present invention.
Figure 2:
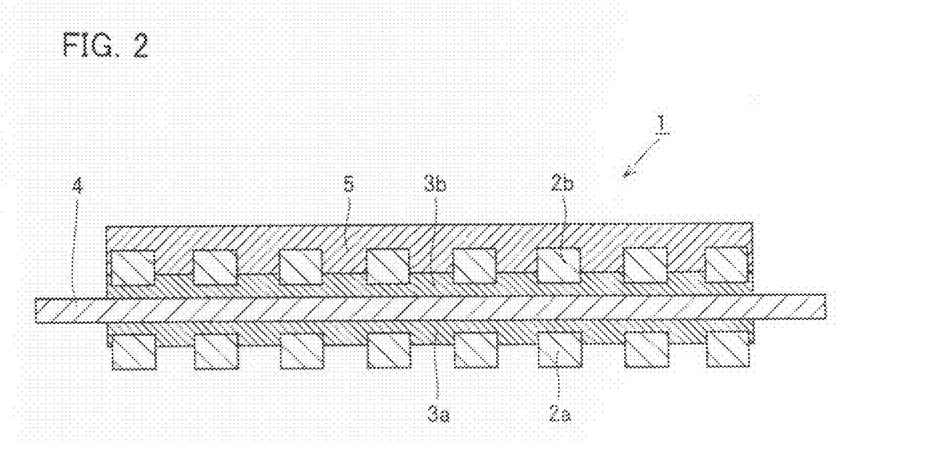
FIG. 2 is a schematic section view of the fuel cell shown in FIG. 1.

FIG. 1 shows a schematic exploded perspective view of a fuel cell in the first embodiment of the present invention. FIG. 2 shows a schematic section view of the fuel cell in the first embodiment of the present invention shown in FIG. 1. Here, a fuel cell 1 in the first embodiment of the present invention has such a structure that an anode conductive layer 2a, an anode catalyst layer 3a, an electrolyte membrane 4, a cathode catalyst layer 3b, a cathode conductive layer 2b and a cathode diffusion layer 5 are stacked in this order.

When a methanol aqueous solution, for example, is supplied as a fuel to the anode side of fuel cell 1 having such a structure, the methanol aqueous solution causes the following oxidization reaction in anode catalyst layer 3a and decomposes into electrons, protons and carbon dioxide.

$$CH_3OH+H_2O \rightarrow CO_2+6H^++6e^-$$

The electrons generated as a result of this reaction are collected by anode conductive layer 2a, and move to cathode conductive layer 2b via an external load (not illustrated). Protons move to cathode catalyst layer 3b via electrolyte membrane 4.

On the other hand, on the cathode side, external air of fuel cell 1 is supplied to cathode catalyst layer 3b through cathode diffusion layer 5, electrons are supplied from cathode conductive layer 2b to cathode catalyst layer 3b, and protons are supplied from electrolyte membrane 4 to cathode catalyst layer 3b. In cathode catalyst layer 3b, oxygen in the aforementioned air and electrons and protons cause the following reduction reaction to generate water.

$$O_2+4H^++4e^- \rightarrow 2H_2O$$

Then, the water generated in cathode catalyst layer 3b as a result of the above reaction is drained outside fuel cell 1 through cathode diffusion layer 5. Cathode diffusion layer 5 functions as resistance for water drainage, and the water concentration in cathode catalyst layer 3b is kept high, and water gets mingled into electrolyte membrane 4 depending on the water concentration. Inside electrolyte membrane 4, when the water concentration on the side of cathode catalyst layer 3b is higher than the water concentration on the side of anode catalyst layer 3a, water on the side of cathode catalyst layer 3b inside electrolyte membrane 4 diffuses toward the side of anode catalyst layer 3a.

Figure 3A:
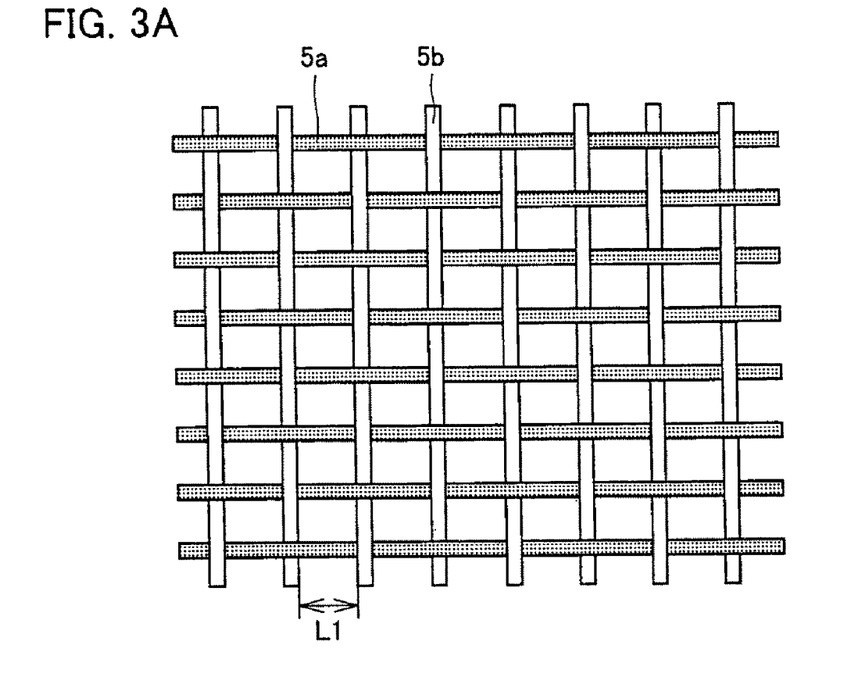
FIGS. 3A and 3B are schematic plan views of one example of a cathode diffusion layer used in the fuel cell of the present invention.
Figure 3B:
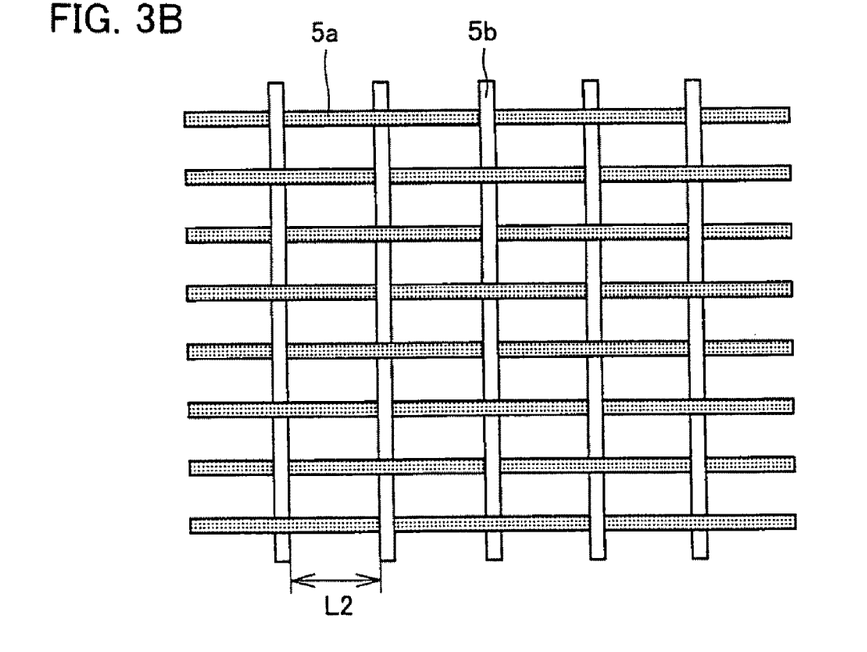

FIG. 3A and FIG. 3B show schematic plan views of one example of cathode diffusion layer 5 constituting fuel cell 1 of the first embodiment of the present invention. Here, cathode diffusion layer 5 has a water-swellable fiber 5a and a non-water-swellable fiber 5b.

In cathode diffusion layer 5 having such a structure, when the humidity inside cathode diffusion layer 5 decreases, water-swellable fiber 5a releases water and contracts, so that the interval of non-water-swellable fibers 5b is reduced to L1 as shown in FIG. 3A, for example, and gas permeability of cathode diffusion layer 5 is reduced, resulting that release of water generated from cathode catalyst layer 3b can be suppressed. Further, when the humidity inside cathode diffusion layer 5 increases, water-swellable fiber 5a absorbs water and swells, so that the interval of non-water-swellable fibers 5b increases to L2 (L2>L1), for example, as shown in FIG. 3B, and gas permeability of cathode diffusion layer 5 increases, resulting that flooding due to supersaturation of water can be prevented.

Therefore, in fuel cell 1 of the present invention, even when the external environment changes, it is possible to appropriately control gas permeability of cathode diffusion layer 5, and it is possible to keep the water concentration in cathode catalyst layer 3b high while preventing reduction in power generation efficiency due to flooding, with the result that high power generation performance can be maintained even in the case of change in the external environment.

In fuel cell 1 of the present invention, since the fuel tank can be miniaturized by utilizing water diffusion in anode catalyst layer 3a for generation of a methanol aqueous solution serving as a liquid fuel, a fuel cell system including fuel cell 1 of the present invention can also be miniaturized.

Further, in fuel cell 1 of the present invention, since no other member than cathode diffusion layer 5 is required for controlling gas permeability of cathode diffusion layer 5, it is possible to reduce the number of members required for production of fuel cell 1. Also simplification of the assembling process of fuel cell 1 will improve the productivity of fuel cell 1.

Further, in the above description, the case where a methanol aqueous solution is used as a fuel was described, however, the fuel to be supplied to fuel cell 1 of the present invention is not limited to this. As a fuel to be supplied to fuel cell 1 of the present invention, organic fuels including hydrogen may be preferably used, and such organic fuels may be used in the form of a mixture with exhaust gas or a mixed liquid fuel composed of two or more kinds of liquids. As the fuel to be supplied to fuel cell 1 of the present invention, for example, a mixture of one or two kind(s) selected from lower alcohols such as methanol or ethanol, DME (dimethyl ether), formaldehyde, methyl formate, formic acid, acetone, toluene and the like may be used.

In the following, constituents that form fuel cell 1 of the present invention will be described.

(Electrolyte Membrane 4)

As electrolyte membrane 4 constituting fuel cell 1 of the present invention, for example, a conventionally known solid polymer electrolyte membrane may be used. As the solid polymer electrolyte membrane used as electrolyte membrane 4, a solid polymer electrolyte membrane made of a perfluorosulfonic acid polymer or a hydrocarbon polymer is preferably used.

As the solid polymer electrolyte membrane used as electrolyte membrane 4, a solid polymer electrolyte membrane having a proton conductivity of $1 \times 10^{-5}$ S/cm or larger is preferably used in terms of obtaining higher power generation performance in fuel cell 1, and a solid polymer electrolyte membrane having a proton conductivity of $1 \times 10^{-3}$ S/cm or larger is more preferably used.

The thickness of electrolyte membrane 4 is preferably 200 µm or smaller in terms of obtaining higher power generation performance by reducing resistance of electrolyte membrane 4, and is preferably 1 µm or larger in terms of increasing the preventive effect of crossover of the fuel.

(Anode Catalyst Layer 3a, Cathode Catalyst Layer 3b)

As anode catalyst layer 3a and cathode catalyst layer 3b constituting fuel cell 1 of the present invention, for example, those made up of a catalyst, conductive particles carrying the catalyst and an ion conductive binder may be used.

Here, as the catalyst, for example, noble metals such as Pt, Ru, Au, Ag, Rh, Pd, Os or Ir or base metals such as Ni, V, Ti, Co, Mo, Fe, Cu or Zn may be used singly or in combination of two or more kinds.

As the conductive particles, carbon particles such as acetylene black, ketjen black, furnace black, carbon nano tubes, carbon nano horns or fullerene, for example, may be used.

As the ion conductive binder, for example, a polymer electrolyte made of a similar material as that of the solid polymer electrolyte membrane used as electrolyte membrane 4 described above may be used.

The thicknesses of anode catalyst layer 3a and cathode catalyst layer 3b are preferably 0.1 mm or smaller in terms of decreasing resistance of proton conduction and resistance of electron conduction, respectively, while desirably supplying a fuel or oxygen to the inside of the catalyst layer, and preferably 0.1 µm or larger in terms of improving the output voltage by obtaining a sufficient catalyst carrying amount.

In the present invention, it is preferred that at least part of cathode catalyst layer 3b is in contact with cathode diffusion layer 5. In this case, since the humidity inside cathode catalyst layer 3b and the humidity inside cathode diffusion layer 5 are in close conditions, water-swellable fiber 5a constituting cathode diffusion layer 5 tends to be able to appropriately conduct absorption and release of water.

(Anode Conductive Layer 2a, Cathode Conductive Layer 2b)

Anode conductive layer 2a constituting fuel cell 1 of the present invention has a function of giving/receiving electrons with respect to anode catalyst layer 3a. Also cathode conductive layer 2b constituting fuel cell 1 of the present invention has a function of giving/receiving electrons with respect to cathode catalyst layer 3b. Further, each of anode conductive layer 2a and cathode conductive layer 2b has a function of a drawing electrode.

Further, as a material of anode conductive layer 2a and as a material of cathode conductive layer 2b, from the viewpoint of suppressing the voltage drop by anode conductive layer 2a and cathode conductive layer 2b themselves, respectively, a metal containing at least one kind selected from the group consisting of Au, Ag, Pt, Ni, Cu, Al, W, Sn and Ti is preferably used, and among these, a metal containing at least one kind selected from the group consisting of Au, Cu, Ti and Sn is more preferably used. By using the above metals respectively as a material of anode conductive layer 2a and as a material of cathode conductive layer 2b, specific resistances of anode conductive layer 2a and cathode conductive layer 2b are reduced, so that voltage drops due to resistances of anode conductive layer 2a and cathode conductive layer 2b are reduced, and higher power generation performance can be obtained.

The thicknesses of anode conductive layer 2a and cathode conductive layer 2b are preferably 0.1 μm or larger in terms of suppressing the voltage drop by own resistances of anode conductive layer 2a and cathode conductive layer 2b.

Further, in the present invention, it is preferred that at least one of cathode catalyst layer 3b and cathode conductive layer 2b is joined with cathode diffusion layer 5. In this case, it tends to be possible to effectively prevent peeling off of cathode diffusion layer 5 and effectively inhibit malfunction of water-swellable fiber 5a caused by the fact that the humidity condition inside cathode catalyst layer 3b is not rapidly transmitted to cathode diffusion layer 5.

Here, as a method of joining at least either one of cathode catalyst layer 3b and cathode conductive layer 2b with cathode diffusion layer 5, for example, chemical bonding, or joining based on an anchor effect or adhesion is used, and more specifically, a method of joining by a tackiness agent, a method of joining by an adhesive based on macromolecule polymerization or the like may be used.

Further, each of anode conductive layer 2a and cathode conductive layer 2b preferably has the form having a through hole penetrating in the thickness direction of the layer. As such a form, for example, a plate or foil form pierced with a plurality of holes, a mesh form, or an expand metal form can be exemplified.

When anode conductive layer 2a has the aforementioned through hole, it tends to be advantageous in that a fuel such as a liquid fuel is effectively supplied to anode catalyst layer 3a via the through hole of anode conductive layer 2a.

Further, when cathode conductive layer 2b has the above through hole, it tends to be advantageous that oxygen in air is effectively supplied to cathode catalyst layer 3b via the through hole of cathode conductive layer 2b. Further, when cathode conductive layer 2b has the aforementioned through hole, it tends that water generated in cathode catalyst layer 3b can be drained effectively to cathode diffusion layer 5 via the through hole of cathode conductive layer 2b. Further, when cathode conductive layer 2b has the aforementioned through hole, it is preferable also in the point that cathode diffusion layer 5 and cathode catalyst layer 3b can be conveniently joined with each other in the region of the through hole.

Further, when deterioration by erosion is problematic in each of anode conductive layer 2a and cathode conductive layer 2b, anode conductive layer 2a and cathode conductive layer 2b may be coated with a noble metal such as Au, Pt, Pd or Ru or carbon and the like as a material having such corrosion resistance that will not eluate a metal ion in the atmosphere of an acidic aqueous solution or in the oxygen atmosphere, and will not form a nonconductive layer. As a result, it tends to be possible to prevent a metal ion from eluting from anode conductive layer 2a and cathode conductive layer 2b, and it tends to be possible to prevent contamination of a metal ion into anode catalyst layer 3a, into cathode catalyst layer 3b and into electrolyte membrane 4. Further, since formation of a nonconductive layer by each of anode conductive layer 2a and cathode conductive layer 2b can be reduced, long-term reliability can be obtained for fuel cell 1.

(Cathode Diffusion Layer 5)

Cathode diffusion layer 5 forming fuel cell 1 of the present invention can be made up of water-swellable fiber 5a and non-water-swellable fiber 5b as described above. In the present invention, water-swellable fiber 5a refers to a fiber having a swelling coefficient (%) calculated by the following formula (1) of 5% or higher, and non-water-swellable fiber 5b refers to a fiber having a swelling coefficient (%) calculated by the following formula (1) of less than 5%.

$$\text{Swelling coefficient}(\%) = 100 \times \{(\text{fiber length in swelled condition}) - (\text{fiber length in dry condition})\} / (\text{fiber length in dry condition}) \quad (1)$$

Here, a fiber is rewounded at a constant speed under a load of 0.88 mN/dtex (0.1 g/de) by using a rewinding frame having a frame circumference of 1.125 m, to produce a reel having a winding number of 10. The reeled fiber is left still in the of a temperature of 20° C. and a humidity of 65RH % for 24 hours (dry condition). The length of the resultant fiber is measured under a load of 1.76 mN/dtex (200 mg/de) for a non-elastic fiber, or under a load of 0.0088 mN/dtex (1 mg/de) for an elastic fiber, and the resultant fiber length (mm) is shown as the fiber length in dry condition in the above formula (1).

Further, a fiber in dry condition is dipped in water at a water temperature of 20° C. for 5 minutes (swelled condition), and then drawn up from the water. Then the length of the resultant fiber is measured under a load of 1.76 mN/dtex (200 mg/de) for a non-elastic fiber, or under a load of 0.0088 mN/dtex (1 mg/de) for an elastic fiber, and the resultant fiber length (mm) is shown as the fiber length in swelled condition in the above formula (1).

In the above, the non-elastic fiber means a fiber having an elongation at break of 200% or less, and the elastic fiber means fiber having an elongation at break of larger than 200%. The breaking strength (%) can be calculated according to the following formula (2).

$$\text{Breaking strength}(\%) = \{100 \times (\text{fiber length at break of fiber as a result of elongation of the fiber}) / (\text{fiber length before elongation of the fiber})\} \quad (2)$$

In the present specification, the term "dry condition" refers to the condition after leaving still for 24 hours in an environment at a temperature of 20° C. and a humidity of 65RH %, and the term "swelled condition" refers to the condition after dipping for 5 minutes in water at a water temperature of 20° C.

As water-swellable fiber 5a, for example, a water-swellable polymer such as a water-swellable plastic or a water-swellable rubber that is made into a fiber form may be used, and for example, a polyether ester fiber formed of a polyether ester elastomer; polyester fibers into which a polyacrylic acid metal salt, polyacrylic acid and a copolymer thereof, polymethacrylic acid and a copolymer thereof, polyvinyl alcohol and a copolymer thereof, polyacrylamide and a copolymer thereof, or a polyoxyethylene-based polymer is blended; polyester copolymerized with a 5-sulfoisophthalic acid component; cellulose acetate having subjected to deacetylation treatment; and copolymers of anhydrous polyacidic amino acid having an ethylenic unsaturated double bond, and a compound having a sulfonic acid group containing an ethylenic unsaturated double bond may be used. Among these, a polyether ester fiber of a polyether ester elastomer made up of polybutylene terephthalate as a hard segment, and polyoxyethylene glycol as a soft segment is preferable because it has not only water-swellability but also elasticity, and is able to easily provide a difference in fiber length between water-swellable fiber 5a and non-water-swellable fiber 5b utilizing the elasticity.

As non-water-swellable fiber 5b, for example, natural fibers such as cotton or hemp, cellulose-based chemical fibers such as rayon or acetate, synthetic resins including polyesters represented by polyethylene terephthalate or polytrimethylene terephthalate, polyamide, polyacrylnitrile or polypropylene may be used. Among these, as non-water-swellable fiber 5b, an usual polyester fiber is preferably used.

In the present invention, cathode diffusion layer 5 may be manufactured using water-swellable fiber 5a and non-water-swellable fiber 5b in an usual weaving technique. Here, when water-swellable fiber 5a is arranged in both of a warp and a weft constituting a fabric, the fiber length elongates in both of the warp and the weft in swelled condition, to fill gaps of the fabric structure of cathode diffusion layer 5. Therefore, in terms of effectively improving gas permeability in swelled condition, water-swellable fiber 5a is preferably arranged either one of the warp and the weft as long as it is possible. Therefore, taking the entirety of water-swellable fiber 5a contained in a fabric constituting cathode diffusion layer 5 as 100 parts by mass, water-swellable fiber 5a is preferably arranged so that it is contained by 70 parts by mass or more in the warp or contained by 30 parts by mass or less in the weft of the fabric constituting cathode diffusion layer 5, or contained by 70 parts by mass or more in the weft or contained by 30 parts by mass or less in the warp, and more preferably arranged in either one of the warp or the weft of the fabric constituting cathode diffusion layer 5. As a result, as shown in FIG. 3A and FIG. 3B, it tends that water-swellable fiber 5a swells and elongates as it absorbs water, and the interval between neighboring non-water-swellable fibers 5b is extended from L1 to L2, and the gap of the fabric structure of cathode diffusion layer 5 is enlarged, so that gas permeability is improved.

As to such gas permeability improving effect, the gas permeability in swelled condition is improved preferably by 30% or more, and more preferably by 50 to 300%, compared to that in dry condition. Gas permeability is measured by JIS L 1096-1998, 6. 27. 1, A method (a fragile-type gas permeability test machine method).

The change rate of gas permeability (%) may be calculated by the following formula (3).

Change rate of gas permeability(%)=100×{(gas permeability in swelled condition)−(gas permeability in dry condition)}/(gas permeability in dry condition)  (3)

Figure 4A:
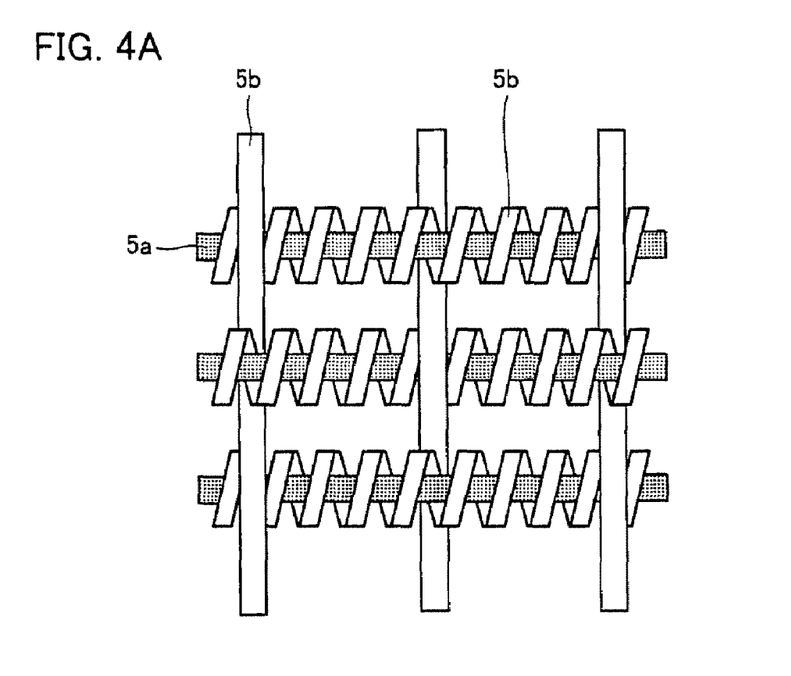
FIGS. 4A and 4B are schematic plan views of another example of the cathode diffusion layer used in the fuel cell of the present invention.
Figure 4B:
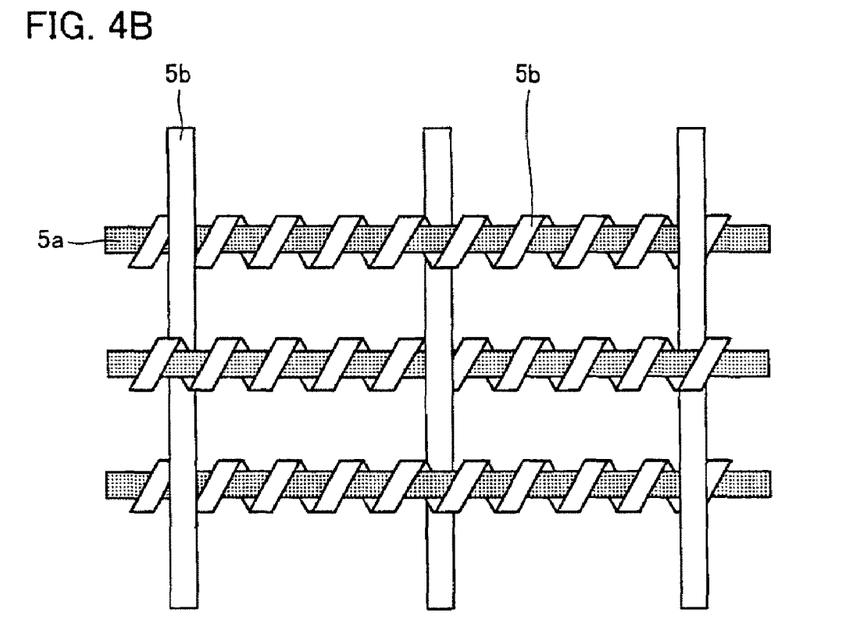

The structure of water-swellable fiber 5a is not particularly limited insofar as the fiber length can be increased or decreased by absorbing or releasing of water, however, it is preferred that cathode diffusion layer 5 includes a core-in-sheath fiber structure in which water-swellable fiber 5a is arranged in a core part, and non-water-swellable fiber 5b is arranged in a sheath part. As a result, when water-swellable fiber 5a arranged in the core part is dried and contracted, crimps of non-water-swellable fiber 5b arranged in the sheath part expand more sterically, for example, as shown in the schematic plan view of FIG. 4A. On the other hand, when water-swellable fiber 5a arranged in the core part absorbs water and swells and elongates, non-water-swellable fiber 5b arranged in the sheath part is drawn and elongated, for example, as shown in the schematic plan view of FIG. 4B, and the steric nature of crimps of non-water-swellable fiber 5b is lost. As a result, the change rate of gas permeability improves.

When cathode diffusion layer 5 includes a core-in-sheath fiber structure in which water-swellable fiber 5a is arranged in a core part, and non-water-swellable fiber 5b is arranged in a sheath part, a ratio between fiber length $L_A$ of water-swellable fiber 5a and fiber length $L_B$ of non-water-swellable fiber 5b in dry condition ($L_A/L_B$) is preferably 0.9 or less, and more preferably 0.2 or more and 0.9 or less. When $L_A/L_B$ is larger than 0.9, gas permeability tends to be difficult to change, while when $L_A/L_B$ is 0.2 or more and 0.9 or less, gas permeability tends to largely change.

As a manufacturing method of the above core-in-sheath fiber structure, for example, conventionally known processes such as an interlace air process, a Taslan air process, a covering process, or a complex texturing crimping process may be used. Among these, it is preferred to manufacture the core-in-sheath fiber structure using a covering process capable of forming a definite core-in-sheath fiber structure.

In the present invention, in order to effectively supply gas while preventing cathode diffusion layer 5 from being clogged by a liquid, cathode diffusion layer 5 preferably has a water-repellent surface. As a method of making the surface of cathode diffusion layer 5 water repellent, for example, a method of applying a silicone-based water-repellent agent, a fluorine-based water-repellent agent or the like by a generally employed padding method or spray method can be recited.

As a textile weave of the fabric structure of cathode diffusion layer 5, for example, textile weaves such as plain weave, twill weave, and satin are preferred, however, it goes without saying that the textile weave is not limited to these.

As a weaving condition of cathode diffusion layer 5, the cover factor of the fabric is preferably in the range of 1200 to 1900, inclusive, and more preferably in the range of 1500 to 1800, inclusive in order to inhibit increase in the constraint force of the textile weave, and to inhibit occurrence of misalignment of yarns. The cover factor (CF) can be calculated according to the following formula (4):

$$CF = T_s \cdot (Td)^{1/2} + Y_s \cdot (Yd)^{1/2} Td \quad (4)$$

In the above formula (4), Ts represents warp weaving density (number/2.54 cm), Ys represents weft weaving density (number/2.54 cm), Td represents total fineness of warp (dtex/1.1), and Yd represents total fineness of weft (dtex/1.1).

It is preferred that cathode diffusion layer 5 is made up of a plurality of layers. As a result, even when a layer that is in contact with cathode conductive layer 2b and/or cathode catalyst layer 3b, of the layers constituting cathode diffusion layer 5 is secured by being joined with cathode conductive layer 2b and/or cathode catalyst layer 3b, a layer that is not secured in cathode diffusion layer 5 will not interfere with a change in shape of cathode diffusion layer 5, so that gas permeability can be appropriately changed.

When cathode diffusion layer 5 is made up of a plurality of layers, it is preferred that a layer formed exclusively of non-water-swellable fiber 5b is arranged in the layer that is in contact with cathode conductive layer 2b and/or cathode catalyst layer 3b.

In this case, the layer that is in contact with cathode conductive layer 2b and/or cathode catalyst layer 3b in cathode diffusion layer 5 will have little change in fiber length by swelling or contraction caused by absorption or release of water, so that it tends to be possible to prevent peel-off or dropout of cathode diffusion layer 5.

<Second Embodiment>

Figure 5:
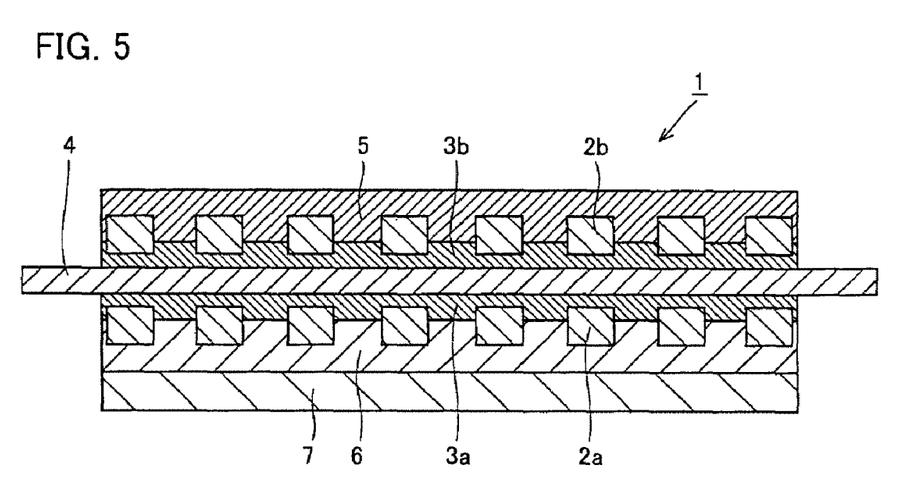
FIG. 5 is a schematic section view of another example of the fuel cell of the present invention.

FIG. 5 shows a schematic section view of a fuel cell according to the second embodiment of the present invention. A fuel cell 1 according to the second embodiment of the present invention has a similar structure to that of fuel cell 1 according to the first embodiment except that on the surface of an anode catalyst layer 3a, an anode diffusion layer 6 and a fuel permeation layer 7 are stacked in this order.

In the following, description will be given individually for anode diffusion layer 6 and fuel permeation layer 7 constituting fuel cell 1 in the second embodiment of the present invention.

(Anode Diffusion Layer 6)

As anode diffusion layer 6 constituting fuel cell 1 of the present invention, any layer allowing permeation of a fuel having permeated fuel permeation layer 7 into anode catalyst layer 3a, and having a communication hole that enables carbon dioxide generated in anode catalyst layer 3a to be discharged outside may be used without any particular limitation.

Here, the porosity (%) of anode diffusion layer 6 is preferably 5% or more, and more preferably 30% or more. The porosity (%) of anode diffusion layer 6 may be calculated by the following formula (5) from the specific gravity of anode diffusion layer 6 determined by the volume and the mass of anode diffusion layer 6, and from the specific gravity of the material that forms anode diffusion layer 6.

$$\text{Porosity}(\%) = 100 \times \{1 - (\text{specific gravity of anode diffusion layer 6/specific gravity of material forming anode diffusion layer 6})\} \quad (5)$$

As anode diffusion layer 6, for example, electron conductive materials including a nonwoven fabric of a carbon fiber or a metal fiber represented by carbon paper, cloth produced by weaving a bundle of carbon fibers, and a water-repellent porous sheet produced by dispersing carbon particles or metal particles in polytetrafluoroethylene as a binder may be used. When such an electron conductive material is used as anode diffusion layer 6, it becomes possible to promote receiving of electrons from anode catalyst layer 3a, and delivering of electrons to anode conductive layer 2a. On the other hand, when it is intended to prevent electric shunt with outside of fuel cell 1, for example, insulating materials such as a fabric or a nonwoven fabric produced by weaving a bundle fiber of a polymer such as polyethylene terephthalate, or porous sheets of polytetrafluoroethylene or polyimide are preferably used.

In order to prevent water transported by diffusion from the cathode side from penetrating anode diffusion layer 6 and fuel permeation layer 7 to enter the fuel tank, anode diffusion layer 6 is more preferably water-repellent, and for example, those obtained by conducting water-repellent treatment on the surface of the above material, or porous materials such as polytetrafluoroethylene (PTFE) or silicone sheets having been subjected to water-repellent treatment may be used for anode diffusion layer 6.

(Fuel Permeation Layer 7)

As fuel permeation layer 7 constituting fuel cell 1 of the present invention, for example, a layer formed of a material that allows permeation of a liquid fuel without being lysed by the liquid fuel, functions as a fuel concentration adjusting layer for adjusting the concentration and the supply amount of a liquid fuel, and hardly allows permeation of carbon dioxide generated in anode catalyst layer 3a may be used.

As fuel permeation layer 7, for example, polymer membranes having a functional group such as a hydroxyl group, an amino group, a carboxyl group, a sulfone group, a phosphate group, an ether group, a ketone group or a silanol group can be recited, and more specifically, a membrane obtained by copolymerizing a combination of polymer materials such as hydroxyethylmethacrylate, polyvinylidone, dimethylacrylamide or glycerol methacrylate is preferably used.

When a material having water repellency is used for fuel permeation layer 7, for example, a nonwoven fabric, a foamed material, or a sintered material formed of a hydrophobic chemical fiber such as an olefinic resin, an aromatic polyester resin or a fluorine-based resin, or an inorganic porous membrane such as a carbon porous member obtained by subjecting the surface of a carbon fiber to water-repellent treatment may be used.

As fuel permeation layer 7, non-porous hydrocarbon-based solid polymer membrane is preferably used. As a material that forms fuel permeation layer 7 exhibiting relatively low permeability of a liquid fuel, for example, sulfonated polyimide, sulfonated polyether ether ketone, sulfonated polyallylene ether or sulfonated polystyrene may be used.

By supplying a fuel via fuel permeation layer 7, even when a liquid fuel containing a high concentration of fuel is used, it is possible to reduce the supply amount of a liquid fuel that reaches anode catalyst layer 3a, and thus to keep a low fuel concentration of the liquid fuel in anode catalyst layer 3a. As a result, it is possible to prevent the phenomenon that a liquid fuel penetrates electrolyte membrane 4, and to improve use efficiency of the liquid fuel. Further, since it becomes possible to supply a liquid fuel having a high fuel concentration, it is possible to reduce the volume of a fuel tank for storing the liquid fuel, and to reduce the size of the fuel cell system.

When a liquid fuel having a high fuel concentration is used, the water concentration contained in the liquid fuel is reduced, so that it is possible to lower the water concentration on the side of anode catalyst layer 3a in electrolyte membrane 4. As a result, a water concentration gradient between the water concentration on the side of cathode catalyst layer 3b and the water concentration on the side of anode catalyst layer 3a in electrolyte membrane 4 becomes large, so that it is possible to effectively increase the water amount transported to the anode side by diffusion in electrolyte membrane 4.

In fuel cell 1 according to the second embodiment of the present invention, even when a liquid fuel having a high fuel concentration is used, it is possible to appropriately supply the liquid fuel to anode catalyst layer 3a by fuel permeation layer 7, and additionally, it is possible to keep high power generation performance even when the external environment changes because the water concentration on the cathode side of electrolyte membrane 4 can be kept high as cathode diffusion layer 5 appropriately controls the humidity in cathode catalyst layer 3b by changing its gas permeability to be suited with the humidity condition in cathode catalyst layer 3b.

EXAMPLES

Example 1

In the present example, a fuel cell having a structure similar to that of fuel cell 1 shown in FIG. 1 (fuel cell of Example 1) was produced. In the following, a producing method of the fuel cell of Example 1 will be described.

First, as electrolyte membrane 4, Nafion (trademark) 117 (available from Du Pont) of 40 mm wide×40 mm long, having a thickness of about 175 μm was prepared.

Next, catalyst-carrying carbon particles (TEC66E50 available from Tanaka Kikinzoku) consisting of Pt particles, Ru particles and carbon particles having a Pt carrying amount of 32.5% by mass and an Ru carrying amount of 16.9% by mass, an alcohol solution containing 20% by mass of Nafion (trademark) (available from Aldrich), isopropanol, and alumina balls were charged in a mass ratio of 0.5:1.5:1.6:100 into a Teflon (trademark) container, and mixed at 500 rpm for 50 minutes using a stirrer, to produce an anode catalyst paste.

On the other hand, a cathode catalyst paste was produced in a similar manner as the anode catalyst paste except that catalyst carrying carbon particles (TEC10E50E available from Tanaka Kikinzoku) consisting of Pt particles and carbon particles and having a Pt carrying amount of 46.8% by mass were used.

Sequentially, the anode catalyst paste produced in the above was screen printed on one surface of the above Nafion (trademark) 117 so that the catalyst carrying amount was 2 mg/cm$^2$ and the anode catalyst paste was formed in the center of the surface of Nafion (trademark) 117 using a screen printing plate having an opening of a square shape of 23 mm wide×23 mm long. Then, the screen printed anode catalyst paste was dried at room temperature, to form anode catalyst layer 3a having a thickness of about 20 μm.

Likewise the anode catalyst paste, the cathode catalyst paste was screen printed on the other surface of Nafion (trademark) 117 at a position which is symmetric to the aforementioned anode catalyst layer 3a, to produce cathode catalyst layer 3b having a thickness of about 20 μm.

Hereinafter, the product obtained by forming anode catalyst layer 3a and cathode catalyst layer 3b on surfaces of Nafion (trademark) 117 is referred to as CCM (Catalyst Coated Membrane).

Polyether ester containing 50% by mass of polybutyleneterephthalate as a hard segment, and 50% by mass of polyoxyethylene glycol having a number average molecular weight of 4000 as a soft segment was melted at 230° C., and extruded through a predetermined spinneret at a discharge rate of 3.05 g/minute. The extruded polyether ester was drawn off by two godet rollers at 705 m/minute, and further wound up at 750 m/minute (winding draft 1.06), to obtain a water-swellable fiber (44 dtex/1 filament). The swelling coefficient of this water-swellable fiber was 25%.

On the other hand, as a non-water-swellable fiber, prepared was a textured and crimped processed yarn (56 dtex/144 filaments) obtained by subjecting an usual multifilament yarn of polyethylene terephthalate having a swelling coefficient of 1% or less to usual texturing and crimping processes.

Then, using an usual covering machine, an usual covering process was conducted at a draft ratio of the core part of 300% (×3), and a covering number of 1000 times/m so that the water-swellable fiber made of the polyether ester fiber forms a core part, and the non-water-swellable fiber formed of the above textured and crimped processed yarn forms a sheath part, to obtain a complex fiber having a core-in-sheath fiber structure (80 dtex/145 filaments). Letting the fiber length of the water-swellable fiber be A, and the fiber length of the non-water-swellable fiber be B in this complex fiber having a core-in-sheath fiber structure, the ratio between A and B (A/B) was 0.29.

Then, as the non-water-swellable fiber, a textured and crimped processed yarn (84 dtex/72 filaments) obtained by subjecting an usual multifilament yarn of polyethylene terephthalate having a swelling coefficient of 1% or less to an usual texturing and crimping processes was arranged in the warp, and the above water-swellable fiber of a polyether ester fiber was arranged in the weft, and a fabric having a plain weave was obtained by an usual weaving method at weaving densities of a warp weaving density of 92 yarns/2.54 cm, and a weft weaving density of 90 yarns/2.54 cm. Then the fabric was subjected to a routine process. In the resultant fabric, the cover factor (CF) was 1600.

Next, the fabric obtained in the manner as described above was immersed with a fluorine-based water-repellent agent of a perfluoroalkyl acrylate copolymer by a padding method, and after wringing by a mangle, it was subjected to heat treatment at 170° C. for 3 minutes, and a water-repellent process in such a condition that 10% by mass of the fluorine-based water-repellent agent was adhered. Thereafter, a kneading process by a tumbler was conducted to release the restraint between fibers.

Then the fabric obtained through the above process was cut into a square shape of 23 mm wide×23 mm long, to give cathode diffusion layer 5. On the surface of cathode diffusion layer 5 on the side of cathode conductive layer 2b and cathode catalyst layer 3b, the cathode catalyst paste produced in the manner as described above was applied uniformly by using a bar coater, and dried for 30 minutes in an atmosphere at room temperature.

As anode conductive layer 2a and cathode conductive layer 2b, gold mesh (available from Nilaco Corporation) of 100 mesh having a wire diameter of 70 μmΦ was used by cutting into rectangular cut pieces of 23 mm wide×50 mm long.

Two sheets of gold mesh were prepared, and catalyst layer faces of CCM (the surface of anode catalyst layer 3a and the surface of cathode catalyst layer 3b) and ends of gold mesh sheets were overlapped in such a manner that CCM was sandwiched between these two sheets of gold mesh. Then, the surface of cathode diffusion layer 5 coated with the aforementioned cathode catalyst paste was overlaid from outside the gold mesh which was to be cathode conductive layer 2b so as to be situated at the same position with cathode catalyst layer 3b, and a 500 μm stainless spacer was arranged, and hot-pressed at a temperature of 130° C. under a pressure of 5 kN for 2 minutes, to produce a fuel cell of Example 1 having the structure as shown in FIG. 1. At this time, two gold mesh sheets were overlaid so that they protrude from CCM in different directions.

Then as an anode casing, an acrylic plate of 60 mm wide× 60 mm long and of 10 mm thick having a hollow of 23 mm wide×23 mm long and of 5 mm depth to be used as a liquid pool in the center was prepared. Then, a tube connector having an inner diameter of 1 mm was attached to the center of the acrylic plate so as to allow supply of a fuel through the acrylic plate.

As a cathode casing, an acrylic plate of 60 mm wide×60 mm long and of 5 mm thick having an opening of 23 mm wide×23 mm long in the center was prepared.

The anode casing was arranged so that the center of the anode casing and the center of anode conductive layer 2a coincide with each other, while the cathode casing was arranged so that the center of the cathode casing and the center of cathode diffusion layer 5 coincide with each other, and thereafter, outer circumferences of the anode casing and the cathode casing were respectively secured.

After securing the anode casing and the cathode casing, the fuel cell of Example 1 was placed in a bath of constant temperature and humidity, a Perista pump (available from ATTO) was connected to the tube connecter part of the anode casing, and a methanol aqueous solution having a methanol concentration of 20% by mass was supplied at a supply rate of 1.2 cc/min. using the Perista pump, while the cathode casing was opened to air.

Then under a load of 0.1 A/cm$^2$ and at a temperature of 25° C., the humidity was retained at 60% RH for 1 hour, at 30% RH for 1 hour, and at 98% RH for 1 hour sequentially, and power generation performance was evaluated, to reveal that the output voltage was 0.25 V after 1 hour retention at a humidity of 60% RH, 0.27 V after 1 hour retention at a humidity of 30% RH, and 0.24 V after 1 hour retention at a humidity of 98% RH.

Comparative Example 1

A fuel cell of Comparative example 1 was produced in a similar manner as in Example 1 except that carbon paper (35BC available from SGL carbon) was used as cathode diffusion layer 5, and a stainless spacer of 500 μm was arranged at the time of hot press. In the same manner as in Example 1, an anode casing and a cathode casing were secured to the fuel cell of Comparative example 1.

For the fuel cell of Comparative example 1 after securing the anode casing and the cathode casing, power generation performance was evaluated in a similar manner as in Example 1. As a result, the output voltage of the fuel cell of Comparative example 1 was 0.23 V after 1 hour retention at a humidity of 60% RH, 0.19 V after 1 hour retention at a humidity of 30% RH, and 0.16 V after 1 hour retention at a humidity of 98% RH. At a humidity of 30% RH, the surface temperature of cathode diffusion layer 5 rose from 40° C. to 50° C.

Comparison of evaluation results of power generation performance in fuel cells of Example 1 and Comparative example 1 revealed that the fuel cell of Example 1 keeps stable output voltage even when the external relative humidity changes, compared to the fuel cell of Comparative example 1.

The larger decrease in the output voltage observed in the fuel cell of Comparative example 1 than the fuel cell of Example 1 is attributable to drying of electrolyte membrane 4 and crossover of the fuel at a humidity of 30% RH, and to flooding at a humidity of 98% RH.

Therefore, in the fuel cell of Example 1, it can be considered that gas permeability of cathode diffusion layer 5 is small at a low humidity of 30% RH, evaporation of water from electrolyte membrane 4 is controlled, and the water concentration on the cathode side of electrolyte membrane 4 is kept high, so that the water transportation amount to the anode side is ensured.

In the fuel cell of Example 1, it can be considered that gas permeability of cathode diffusion layer 5 is large at a high humidity of 98% RH, and drainability of water of cathode diffusion layer 5 increases, so that flooding is suppressed.

Example 2

In the present Example, a fuel cell having a similar structure as fuel cell 1 having a structure shown in FIG. 5 (fuel cell of Example 2) was produced.

As anode diffusion layer 6, carbon paper (35BC available from SGL carbon) cut into a square shape of 23 mm wide×23 mm long was prepared. Then anode diffusion layer 6 formed of this carbon paper was overlaid at the same position with anode catalyst layer 3a from outside of gold mesh which was to be anode conductive layer 2a. Here, a microporous layer of anode diffusion layer 6 was overlaid so that it faces with the side that is in contact with anode conductive layer 2a.

Then, a stainless spacer of 600 μm thick was arranged, and hot press was executed to join anode diffusion layer 6 with anode conductive layer 2a.

Further, as fuel permeation layer 7, a hydrocarbon-based solid polymer membrane (available from TOKUYAMA) was prepared, and fuel permeation layer 7 was arranged outside anode diffusion layer 6 in such a manner that it is in contact with anode diffusion layer 6, and the anode casing and the cathode casing were secured. In this manner, a fuel cell of Example 2 secured to the anode casing and the cathode casing was prepared. Besides this, the fuel cell of Example 2 was produced in a similar manner as in Example 1.

Power generation performance was evaluated in a similar manner as in Example 1 except that a methanol aqueous solution having a methanol concentration of 64% by mass was supplied. As a result, the output voltage of the fuel cell of Example 2 was 0.24 V after 1 hour retention at a humidity of 60% RH, 0.20 V after 1 hour retention at a humidity of 30% RH, and 0.26 V after 1 hour retention at a humidity of 98% RH.

Comparative Example 2

A fuel cell of Comparative example 2 secured to the anode casing and the cathode casing was produced in a similar manner as in Example 2, except that carbon paper (35BC available from SGL carbon) was used as cathode diffusion layer 5, and a stainless spacer of 600 μm was arranged at the time of hot press.

For the fuel cell of Comparative example 2 after securing the anode casing and the cathode casing, power generation performance was evaluated in a similar manner as in Example 2. As a result, the output voltage of the fuel cell of Comparative example 2 was 0.20 V after 1 hour retention at a humidity of 60% RH, 0.02 V after 1 hour retention at a humidity of 30% RH, and 0.14 V after 1 hour retention at a humidity of 98% RH. At a humidity of 30% RH, the surface temperature of cathode diffusion layer 5 rose from 40° C. to 65° C.

Comparison of evaluation results of power generation performance in fuel cells of Example 2 and Comparative example 2 revealed that the fuel cell of Example 2 keeps stable output voltage compared to the fuel cell of Comparative example 2 even when a fuel having a high fuel concentration is supplied, and the external relative humidity changes.

According to the fuel cell of the present invention, since it is possible to change gas permeability of the cathode diffusion layer without requiring other members, and to keep internal humidity of the cathode catalyst layer that is suited for effective diffusion by transportation of water from the cathode side to the anode side of the electrolyte membrane according to the water concentration gradient, it is possible to stably keep high power generation performance even when the external environment changes.

According to the fuel cell of the present invention, it is possible to generate power by supplying a liquid fuel having a high fuel concentration by transportation of water from the cathode side to the anode side, so that it is possible to miniaturize the fuel tank, and thus to miniaturize a fuel cell system including the fuel cell of the present invention.

The fuel cell and the fuel cell system including the fuel cell of the present invention can be suitably used as a compact power source for a portable electronic device, for example.

Although the present invention has been described and illustrated in detail, it is clearly understood that the same is by way of illustration and example only and is not to be taken by way of limitation, the scope of the present invention being interpreted by the terms of the appended claims.

What is claimed is:
1. A fuel cell comprising: an anode conductive layer, an anode catalyst layer, an electrolyte membrane, a cathode catalyst layer, a cathode conductive layer, and a cathode diffusion layer stacked in this order, wherein said cathode diffusion layer has a fabric structure in which a water-swellable fiber and a non-water-swellable fiber are arranged;
   wherein the non-water-swellable fiber comprises a natural fiber, a cellulose-based chemical fiber, or a synthetic resin;
   wherein the water-swellable fiber has a swelling coefficient of 5% or higher and the non-water-swellable fiber has a swelling coefficient of less than 5%;
   wherein the swelling coefficients of the water-swellable fiber and non-water-swellable fiber are determined by the following formula:

swelling coefficient (%)=100×{(fiber length in swelled condition)−(fiber length in dry condition)}/(fiber length in dry condition); and wherein the dry condition is a condition of the fiber after 24 hours in an environment of 20° C. and a relative humidity of 65%, and wherein the swelled condition is a condition of the fiber after dipping for 5 minutes in water having a temperature of 20° C.

2. The fuel cell according to claim 1, wherein said fabric structure is formed by arranging said water-swellable fiber in either one of a warp and a weft.

3. The fuel cell according to claim 1, wherein gas permeability of said cathode diffusion layer increases as the water absorption amount of said water-swellable fiber increases.

4. The fuel cell according to claim 1, wherein said fabric structure includes a core-in-sheath fabric structure in which the water-swellable fiber is arranged in a core part, and the non-water-swellable fiber is arranged in a sheath part.

5. The fuel cell according to claim 1, wherein the surface of said cathode diffusion layer has water repellency.

6. The fuel cell according to claim 1, wherein at least part of said cathode catalyst layer is in contact with said cathode diffusion layer.

7. The fuel cell according to claim 1, wherein said cathode diffusion layer is made up of a plurality of layers.

8. The fuel cell according to claim 7, wherein a first layer of the plurality of layers of the cathode diffusion layer is in contact with said cathode catalyst layer of said cathode diffusion layer, and wherein the first layer is made of a non-water-swellable fiber.

9. The fuel cell according to claim 1, wherein at least one of said cathode catalyst layer and said cathode conductive layer is joined with said cathode diffusion layer.

10. The fuel cell according to claim 1, wherein an anode diffusion layer and a fuel permeation layer are stacked in this order on the anode catalyst layer, such that the anode conductive layer, the anode catalyst layer, the anode diffusion layer, and the fuel permeation layer are stacked in this order, and said anode diffusion layer is provided with a communication hole communicating with external of the fuel cell.

* * * * *